(12) United States Patent
Stanescu et al.

(10) Patent No.: US 11,966,063 B2
(45) Date of Patent: Apr. 23, 2024

(54) MICROSPHERE LENS ASSEMBLY

(71) Applicant: LIG Nanowise Limited, Birmingham (GB)

(72) Inventors: Sorin Stanescu, Birmingham (GB); Sebastien Vilain, Birmingham (GB); Ching Tzu Goh, Birmingham (GB); Lin Li, Birmingham (GB)

(73) Assignee: LIG NANOWISE LIMITED, Birmingham (GB)

( * ) Notice: Subject to any disclaimer, the term of this patent is extended or adjusted under 35 U.S.C. 154(b) by 761 days.

(21) Appl. No.: 16/627,185

(22) PCT Filed: Jun. 28, 2018

(86) PCT No.: PCT/GB2018/051816
§ 371 (c)(1),
(2) Date: Dec. 27, 2019

(87) PCT Pub. No.: WO2019/002873
PCT Pub. Date: Jan. 3, 2019

(65) Prior Publication Data
US 2020/0166769 A1 May 28, 2020

(30) Foreign Application Priority Data
Jun. 28, 2017 (GB) ...................................... 1710324

(51) Int. Cl.
*G02B 27/58* (2006.01)
*B23K 26/06* (2014.01)
(Continued)

(52) U.S. Cl.
CPC .......... *G02B 27/58* (2013.01); *B23K 26/0665* (2013.01); *G02B 3/0037* (2013.01); *G02B 21/02* (2013.01); *G02B 21/0036* (2013.01)

(58) Field of Classification Search
CPC ........ G02B 27/58; G02B 27/56; G02B 27/16; G02B 3/00; G02B 3/0037; G02B 3/0087;
(Continued)

(56) References Cited

U.S. PATENT DOCUMENTS 3,263,070 A * 7/1966 Hine ....................... F21V 14/00
352/198
5,448,399 A 9/1995 Park et al.
(Continued)

FOREIGN PATENT DOCUMENTS

CN 2540648 Y 3/2003
CN 106444069 A 2/2017
(Continued)

OTHER PUBLICATIONS

English translation of JP H11177123. (Year: 1999).*
(Continued)

*Primary Examiner* — Jie Lei
(74) *Attorney, Agent, or Firm* — Gerald T. Gray; Leydig, Voit & Mayer, LTD.

(57) ABSTRACT

A microsphere lens assembly (10) comprises a microsphere lens (1) and a base lens (3) connected together by a column of optically clear material (2) which holds the microsphere lens (1) in a fixed position relative to the base lens (3). If the microsphere lens (1) is fixed in the correct position relative to the base lens (3), the assembly (10) can be used, in combination with a suitable microscope, for carrying out super resolution microscopy and/or machining.

13 Claims, 8 Drawing Sheets

(51) Int. Cl.
*G02B 3/00* (2006.01)
*G02B 21/02* (2006.01)
*G02B 21/00* (2006.01)

(58) Field of Classification Search
CPC .... G02B 21/02; G02B 21/00; G02B 21/0036; G02B 21/002; G02B 7/02; B23K 26/06; B23K 26/0665; B23K 26/064; B23K 26/073
USPC ............... 359/656, 664, 661, 642, 645, 368
See application file for complete search history.

(56) References Cited

U.S. PATENT DOCUMENTS

| | | | |
|---|---|---|---|
| 6,501,045 B1 | 12/2002 | Bernstein et al. | |
| 2007/0148567 A1 | 6/2007 | Ferber et al. | |
| 2011/0211261 A1* | 9/2011 | Fukuta ................. | B29C 39/025 427/165 |
| 2012/0168412 A1 | 7/2012 | Hooper | |

FOREIGN PATENT DOCUMENTS

| | | | |
|---|---|---|---|
| GB | 2553420 A | 3/2018 | |
| JP | H11177123 * | 7/1999 | ............ B29D 11/00 |
| JP | 3574571 B2 * | 10/2004 | ............ G11B 7/135 |
| WO | WO 2011/090441 A1 | 7/2011 | |
| WO | WO 2017/034484 A1 | 3/2017 | |

OTHER PUBLICATIONS

English translation of JP 3574571 (Year: 2000).*
Search Report in GB1710324.3 dated Nov. 16, 2017.
Search Report in GB1810650.0 dated Dec. 21, 2018.
Gergely Huszka et al., "Microsphere-based super-resolution scanning optical microscope" Optics Express vol. 25, No. 13, Jun. 26, 2017.
Zengbo Wang et al., "Optical virtual imaging at 50 nm lateral resolution with a white-light nanoscope" Nature Comm. DOI: 10.1038/ncomms1211, Mar. 1, 2011.
Norland Products, "Norland Optical Adhesive 63" https://www.norlandprod.com/adhesives/noa63.html.
Carl Zeiss Microscopy GmbH, "ZEISS Axio Imager 2 Your Open Microscope System for Automated Material Analysis" Product Information Version 1.1.
Bing Yan et al., "Engineering near-field focusing of a microsphere lens with pupil masks" Optics Comm. 370 (2016) pp. 140-144.
Gergely Huszka et al., "Turning a normal microscope into a super-resolution instrument using a scanning microlens array" Scientific Reports (2018) 8:601, Jan. 12, 2018.
Sorin Laurentiu Stanescu et al., "Imaging with the Super-resolution Microsphere Amplifying Lens (SMAL) Nanoscope" J. Phys.: Cont. Ser. 902 012014, 2017.
Written Opinion of the International Searching Authority from International Application No. PCT/GB2018/051816, dated Jan. 3, 2019.
Yan et al., "Superlensing Microscope Objective Lense", Applied Optics, (2016).
Darafsheh et al., "Advantages of microsphere-assisted super-resolution imaging technique over solid immersion lens and confocal microscopies", *Applied Physics Letters*, (2014).

* cited by examiner

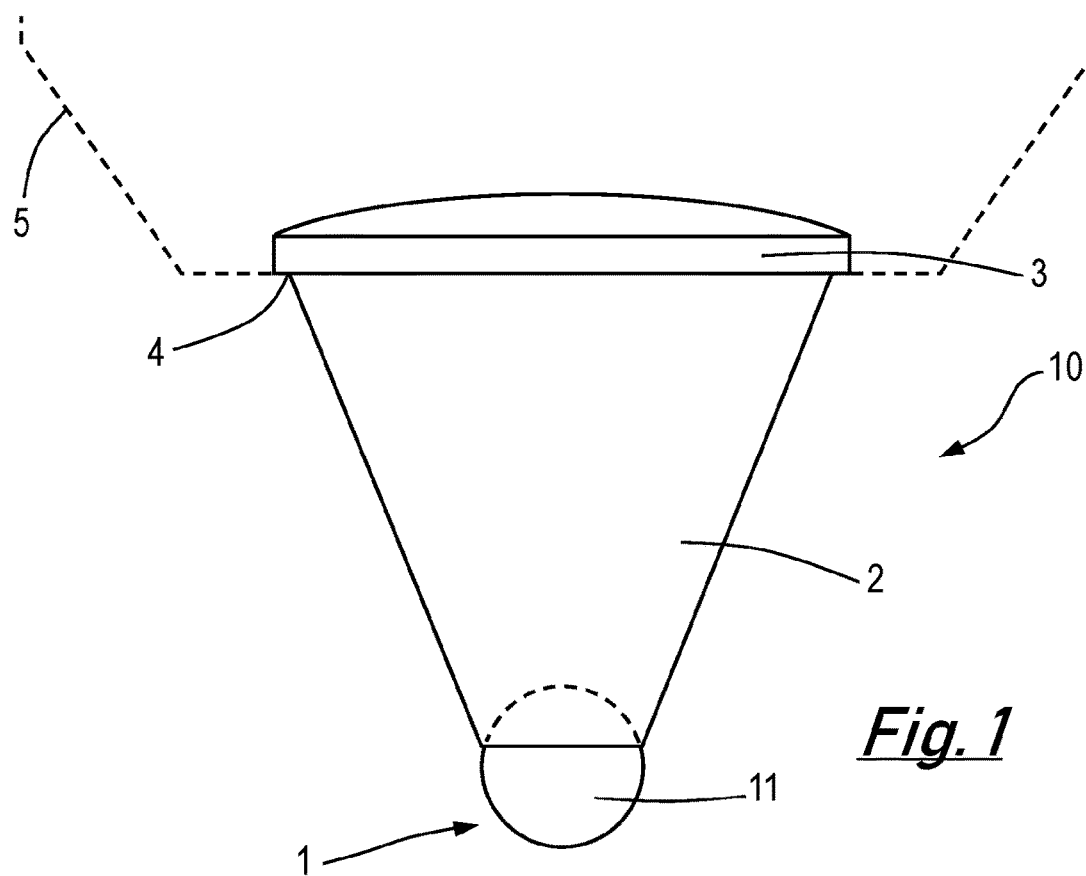
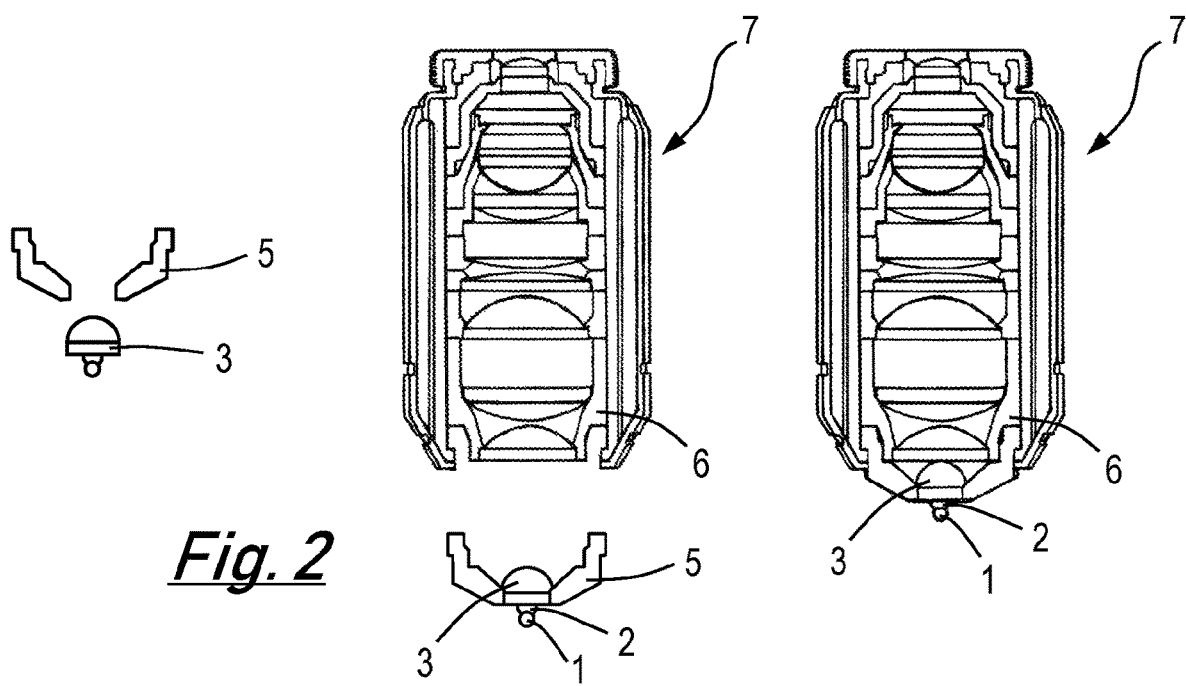

MICROSPHERE LENS ASSEMBLY

TECHNICAL FIELD OF THE INVENTION

The present invention relates to a microsphere lens assembly. In particular, the invention relates to a microsphere lens assembly wherein the microsphere is attached to an objective lens of a microscope. The present invention further relates to the manufacture and use of such a microsphere lens assembly.

BACKGROUND TO THE INVENTION

Conventional optical microscopic imaging resolution has a theoretical limit of approximately 200 nm within the visible light spectrum due to the far-field diffraction limit. As a result, conventional optical microscopic imaging is not suitable for imaging subjects having structures smaller than this limit, for example live viruses (typically 5-150 nm, with some up to 300 nm). In order to image such structures beyond the optical diffraction limit, other techniques have been used.

Transmission electron microscopy (TEM) and scanning electron microscopy (SEM) are often used to image specially prepared dead virus structures at very high resolutions (10 nm) in vacuum. These techniques require complex sample preparation and are not suitable for in vivo imaging and measurements (the electron beam affects the living cells, viruses etc.).

Atomic force microscopes (AFMs) offer good imaging of small features samples by a contacting probe. The sample may be easily damaged by the AFM's tip. Moreover, this technique does not offer a real image but a reconstructed imaging.

Stimulated emission depletion (STED) fluorescence optical microscopy is a recently established method for the imaging of cellular structures, bacteria and viruses beyond the optical diffraction limit, down to a resolution of 6 nm. This technique is based on the detection of light emitted by the fluorescing specimen when it is excited by laser light of a specific wavelength and switching off part of the fluorescent zone using another laser light of a different wavelength. STED fluorescent microscopes offer a better resolution but the sample also requires a complex preparation (fluorescent labelling), which may not be always suitable for living organisms imaging. The fluorescent imaging technique gives good results mainly for organic samples. However, for high resolution, this technique is confronted with the challenge of photo bleaching which limits the minimum exposure time of light exposure to tens of seconds.

Recently, super resolution imaging has been demonstrated using arrays of microspheres positioned between objective lens and sample. The microspheres used in such arrays are typically of the order of 10 μm in diameter. Use of microspheres enables the capture of evanescent waves present at the boundary of two different media with different refractive indices in the "far field" zone. These evanescent waves carry high spatial frequency sub-wavelength information and decay exponentially with distance. Hence microspheres close to a surface are more effective at detection of said evanescent waves than a conventional objective lens.

CN102305776B discloses a microsphere of 1-9 um diameter used as a lens, in contact with a target or having less than 100 nm separation from the target for imaging. The imaged target must be metallic or gold coated (for semiconductor material). The measurement mechanism is based on detecting surface plasmons which occur between metal and non-metal. The microsphere holders have two types: a tapered hole ~8 μm on top and 2.8 μm at bottom in silicon to set the sphere using UV curable adhesive; and a transparent glass tip fixing the microsphere using UV curable adhesive. Such arrangements are not especially robust or adapted for ready fitting to existing microscopes. Furthermore, the microsphere is not attached to the objective lens and thus alignment to the optical axis of the objective lens is not guaranteed.

WO2015/025174A1 discloses an array of microspheres embedded in a host material (elastomer or glass or plastic) and placed on the workpiece. Such a sheet of lenses may be reusable, for imaging. Microsphere arrays can be difficult to manufacture and are rather delicate and easily damaged. The use of such small microspheres also presents difficulties in increased distortion of the image and a more restricted field of view. Furthermore, the microspheres are not attached to the objective lens and thus alignment to the optical axis of the objective lens is not guaranteed.

Super resolution imaging apparatus can also be adapted to use in laser based micro fabrication. In such techniques, fabrication resolution is limited by the size of focused laser beam spot. This is of the order of half the laser wavelength, thus machining sub-wavelength features are difficult. Previous efforts have demonstrated the use of microspheres spread on the target surface to allow super-resolution imaging or sub-wavelength laser machining. For practical machining techniques the microspheres must not be placed on the machining target. Such techniques would thus also require a mounting arrangement that is simple, robust, allows for accurate positioning and is readily fitted to existing microscopes.

It is therefore an object of the present invention to enable super resolution microscopy and/or micro-machining that at least partially overcomes or alleviates some of the above problems.

SUMMARY OF THE INVENTION

According to a first aspect of the present invention there is provided a microsphere lens assembly comprising: a base lens; a microsphere lens and a column of optically clear material extending from a front surface of the base lens to the microsphere lens.

The above assembly can be utilised as an objective lens of a microscope or as the front lens of an objective lens arrangement. This assembly thus allows the microscope to be used for super resolution microscopy and laser micromachining. The fixing of the microsphere lens to the base lens by the column allows the microsphere lens to be accurately positioned at a fixed distance from the base lens and aligned to the optical axis in use for optimal performance. The fixing of the microsphere lens in position also provides for a simple and robust construction of the attachment. Such a system is suitable for both metallic and non-metallic target materials and in particular, suitable for imaging and processing biological samples (e.g. cells).

For the purpose of the present application, optically clear material is transparent or substantially transparent to visible light.

The microsphere lens may comprise a microsphere or a truncated microsphere. The use of a microsphere rather than a truncated microsphere increases resolution but also increases distortion. For the avoidance of doubt, a truncated microsphere comprises a microsphere truncated by a plane perpendicular to the optical axis. In some embodiments, the truncated microsphere may comprise a hemisphere.

In some embodiments, the microsphere lens may comprise an array of microspheres. The microsphere array may be formed by any suitable method including, but not limited to, self-assembly. In some embodiments, the microsphere lens may comprise an array of truncated microspheres. Such truncated microspheres may comprise hemispheres.

The microsphere or microspheres comprising the microsphere lens may have a diameter of in the range 1-1000 µm. In one embodiment, the microspheres may have a diameter in the range 90-106 µm. In particular, the microspheres may have a diameter of around 100 µm. In another embodiment, the microspheres may have a diameter in the range 5-15 µm.

The microsphere or microspheres comprising the microsphere lens may have a refractive index in the range of 1.5-4. In one embodiment, the microspheres may have a refractive index in the range 1.55-2.4. In particular, the microsphere lens may have a refractive index of around 1.9-2.2.

The microsphere or microspheres comprising the microsphere lens may be formed from any suitable material, including but not limited to Barium Titanate ($BaTiO_3$), polystyrene, silica ($SiO_2$), diamond, sapphire ($Al_2O_3$), titanium dioxide, cubic zirconia, zinc oxide, silicon, germanium, gallium phosphide, and gallium arsenide or the like.

The optically clear material may comprise glass or a suitable plastic. In such embodiments, the optically clear material may be performed into a column by a suitable technique including but not limited to moulding or machining. In such embodiments, the preformed column may be affixed to the base lens and the microsphere lens by suitable adhesive. Suitable adhesives may include NOA 81, MY-132, MY132A or the like.

The optically clear material may comprise an adhesive or resin. Preferably, the optically clear material is UV curable. In the case that the optically clear material is an adhesive it may comprise an adhesive such as NOA 81, MY-132, MY132A or the like.

The geometry of the column of optically clear material is determined by the relative optical properties and dimensions of the microsphere lens and base lens. In particular, the geometry of the column of optically clear material is selected such that the microsphere lens as a whole is capable of focussing light from a sample for imaging or focussing light on a sample for machining purposes. in preferred embodiments, the column extends from the edges of the base lens to the edges of the microsphere lens. As the microsphere lens is typically narrower than the base lens, the column may be a tapered column. The tapering of the column may be constant or may be variable.

According to a second aspect of the present invention there is provided a method of constructing a microsphere lens assembly, comprising the steps of: attaching a base lens to a microscope; providing a microsphere lens on a sample; applying an optically clear and UV curable material between the base lens and the microsphere lens; adjusting the separation of the microsphere lens with the base lens until such point that the microsphere lens is in the centre of the field of view of the base lens and the sample is in focus; illuminating the back surface of the base lens with UV light; and separating the base lens from the sample.

The method of the second aspect of the present invention may incorporate any or all features of the first aspect of the present invention as desired or as appropriate.

The above method provides for the simple construction of an effective microsphere lens assembly for super resolution microscopy. Centering and focussing ensure that the microsphere lens is positioned at the desired position in relation to the base lens. Illumination of the centred and focussed microsphere lens with UV light results in the curing of a column of optically clear material with the microsphere at its tip. Separation of the base lens from the sample enables the microsphere lens and column to be lifter away from the sample.

In a preferred embodiment the sample is a known sample. In particular, the sample may be a dedicated calibration sample.

The method may include the step of cleaning away excess optically clear material after illuminating the back surface of the base lens with UV light. Cleaning may be achieved by any suitable process including but not limited to wiping away excess material using a suitable cloth or tissue. Cleaning may additionally or alternatively involve the use of a suitable solvent. The particular solvent selected may be varied dependent on the particular optically clear material selected. Suitable solvents may include, but are not limited to isopropanol, sodium hydroxide (preferably diluted), potassium hydroxide (preferably diluted) or the like.

In some cases, illuminating the back surface of the base lens with UV light does not result in complete curing of the optically clear material. In such cases, the method may include the step of exposing the optically clear material to further UV light to complete curing. This further UV exposure preferably takes place after cleaning. The further UV exposure may be provided by an external light source.

In some embodiments, the microsphere lens may comprise a single microsphere. In other embodiments, the microsphere lens may comprise an array of microspheres. The microsphere array may be formed by any suitable method including, but not limited to, self-assembly. Self assembly may involve the steps of providing a suspension of a plurality of microspheres in a water and allowing the water to evaporate. Subsequently, self-assembly may involve applying adhesive to the array of microspheres to fix the microspheres in position. In some embodiments, the adhesive may subsequently be cured. Curing may involve exposure to UV light or any other suitable process.

The method may include the additional step of truncating the microsphere lens. Truncation preferably takes place after the formation of the assembly. Truncation may be achieved by use of any suitable process. In one embodiment, truncation can be achieved by use of a focussed ion beam (FIB) system to cut the microsphere or microspheres comprising the microsphere lens at a desired distance. In another embodiment, truncation may be achieved by milling the microsphere or microspheres comprising the microsphere lens until a desired truncation is archived. Milling may be carried out using a milling stage provided with diamond paste. A variety of different diamond pastes may be applied successively in order to archive a polished truncated surface.

According to a third aspect of the present invention there is provided an objective lens or objective lens arrangement comprising a microsphere lens assembly according to the first aspect of the present invention.

The objective lens or objective lens arrangement of the third aspect of the present invention may include any or all features of the first two aspects of the present invention as desired or as appropriate.

According to a fourth aspect of the present invention there is provided a super resolution microscopy apparatus comprising: a microscope; and an objective lens or objective lens arrangement according to the third aspect of the present invention.

The apparatus of the fourth aspect of the present invention may include any or all features of the first three aspects of the present invention as desired or as appropriate.

The apparatus may comprise illumination means operable to generate light to illuminate the sample. The generated light may be monochrome or broad spectrum as required or desired. The illumination means may be operable to illuminate the sample in reflection or transmission modes. In embodiments where the illumination means are operable to illuminate the sample in reflection, the apparatus may be provided with a restricted aperture between the illumination means and the microsphere lens assembly. The restricted aperture may be operable to provide a narrow beam of illumination, thereby improving resolution.

The apparatus may be provided with an imaging device operable to capture an image of the sample as viewed through the objective lens. Typically, the imaging device may comprise an optical sensing array such as a CCD (charge coupled device) array.

The imaging means may be connected to image processing means operable to process the captured image. The processing may include processing to remove radial (pincushion) distortions towards the edge of the microsphere lens. Additionally or alternatively, the processing may include other steps such as filtering, shadow removal, edge detection, inversion, or the like.

The apparatus may comprise a sample mount upon which sample may be positioned such that it can be viewed through the microsphere lens assembly. The sample mount may be operable to controllably vary the separation between the microsphere lens assembly and the sample. The sample mount may be operable to controllably vary the position of the sample relative to the microsphere lens assembly in a plane perpendicular to the optical axis of the microsphere lens assembly. In such cases, the sample mount may comprise a scanning stage. This can enable scanning of the sample relative to the microsphere lens assembly so that an increased area of the sample can be imaged.

The apparatus may comprise multiple objective lenses. In such cases, the sample may comprise means for switching between said objective lenses. In such embodiments, each objective lens may comprise a microsphere lens assembly.

The or each objective lens may be adapted such that the objective lens may be removed or replaced. Alternatively, the or each objective lens arrangement may be adapted such that the front lens can be removed or replaced.

The apparatus may be provided with a machining laser beam source. The machining laser beam may be aligned to pass through the microsphere lens assembly. This can enable the use of the apparatus for micromachining of a target surface. In particular, this may enable subwavelength laser machining of a target surface.

According to a fifth aspect of the present invention there is provided a method of super resolution microscopy utilising a microscope according to the fourth aspect of the invention, the method comprising: providing a sample; positioning the microsphere lens assembly relative to the sample and capturing one or more images of the sample.

The method of the fifth aspect of the invention may include any or all features of the previous aspects of the invention as desired or as appropriate.

The method may include varying the separation between the microsphere lens assembly and the sample. The method may include varying the position of the sample relative to the microsphere lens assembly in a plane perpendicular to the optical axis of the microsphere lens assembly. In particular, the method may involve scanning the sample relative to the microsphere lens assembly. This enables an increased area of the sample to be imaged.

The method may include introducing a fluid between the microsphere lens assembly and the sample. The fluid may be introduced by application to the sample.

The method may include processing of the captured image. In particular, the method may include processing to remove radial distortions. Additionally or alternatively, the method may include other steps such as filtering, shadow removal, edge detection, inversion, or the like.

The method may include the additional step of machining the sample. Machining may be achieved by providing a machining laser beam source, aligned such that the machining laser beam passes through the microsphere lens assembly; and machining a target surface of the sample by exposing it to the machining laser beam. Machining may take place at the same time as imaging.

According to a sixth aspect of the present invention there is provided a method of machining utilising a microscope according to the fourth aspect of the invention, the method comprising: providing a sample; positioning the microsphere lens assembly relative to the sample; providing a machining laser beam source, aligned such that the machining laser beam passes through the microsphere lens assembly; and machining a target surface of the sample by exposing it to the machining laser beam.

The method of the sixth aspect of the invention may include any or all features of the previous aspects of the invention as desired or as appropriate.

DETAILED DESCRIPTION OF THE INVENTION

In order that the invention may be more clearly understood embodiments thereof will now be described, by way of example only, with reference to the accompanying drawings, of which:

FIG. 1 shows an embodiment of a microsphere lens assembly for a microscope comprising a single microsphere according to the present invention;

FIG. 2 schematically illustrates the fitting of a microsphere lens assembly according to FIG. 1 into an objective lens arrangement;

FIG. 3 schematically illustrates a series of steps in the manufacture of a microsphere lens assembly according to FIG. 1;

Figure 3A:
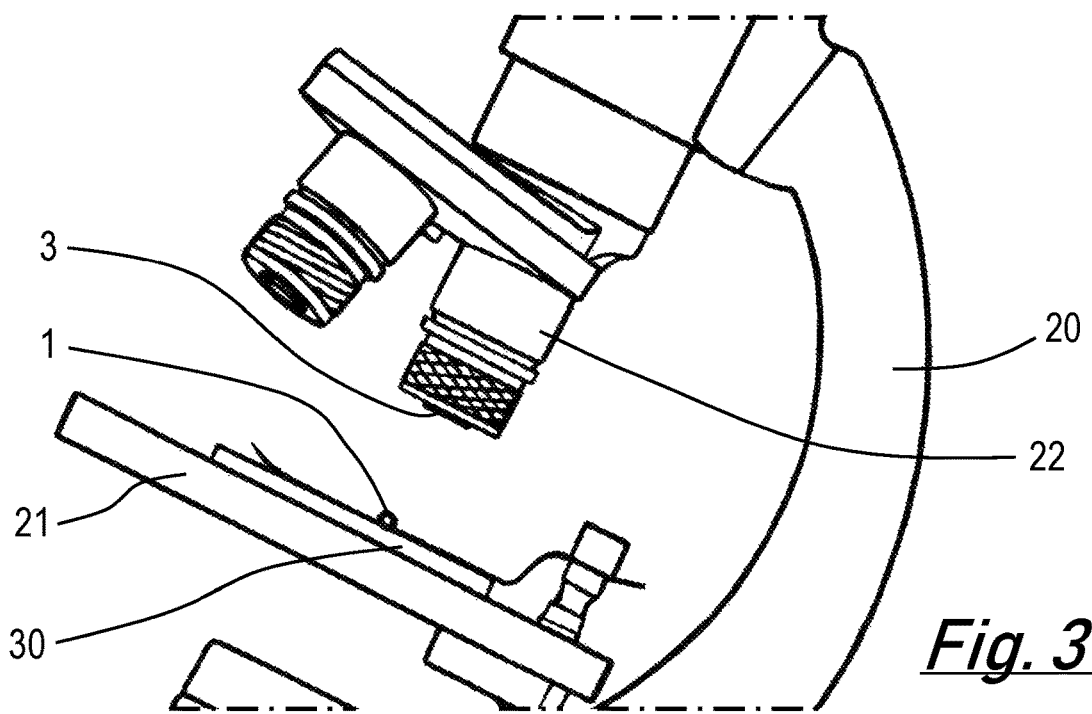
Figure 3B:
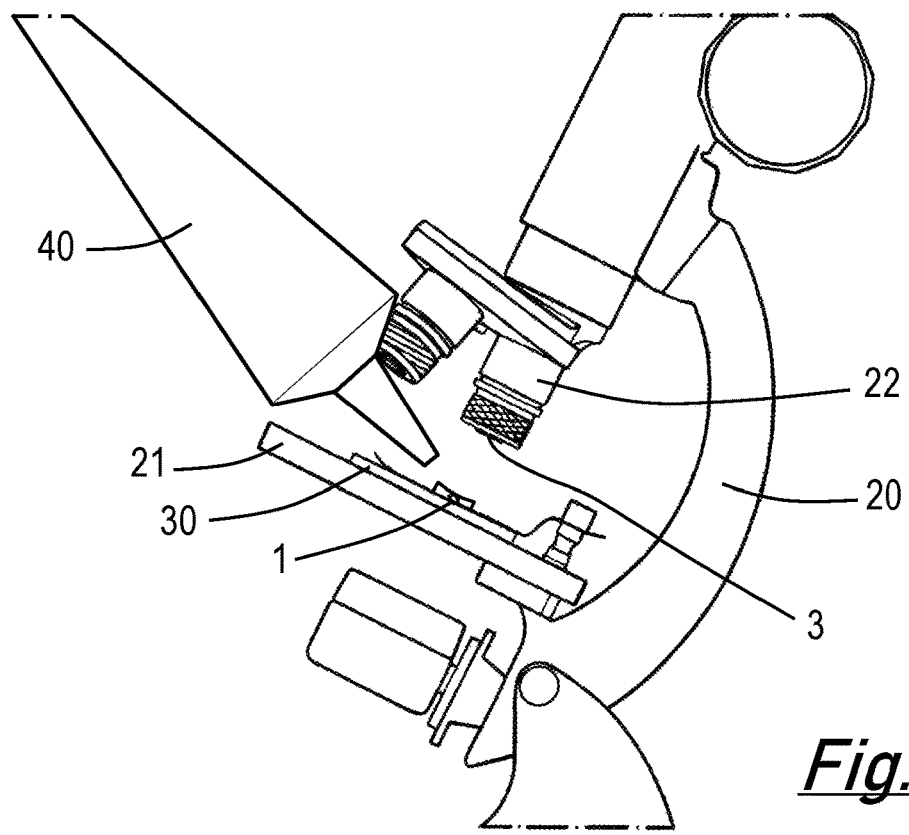
Figure 3C:
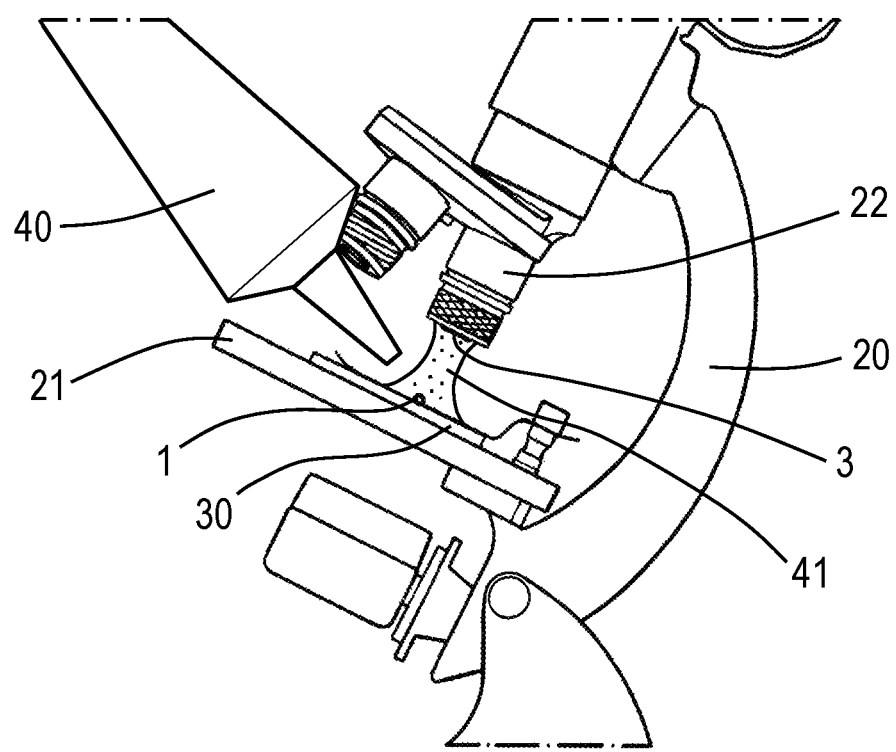
Figure 3D:
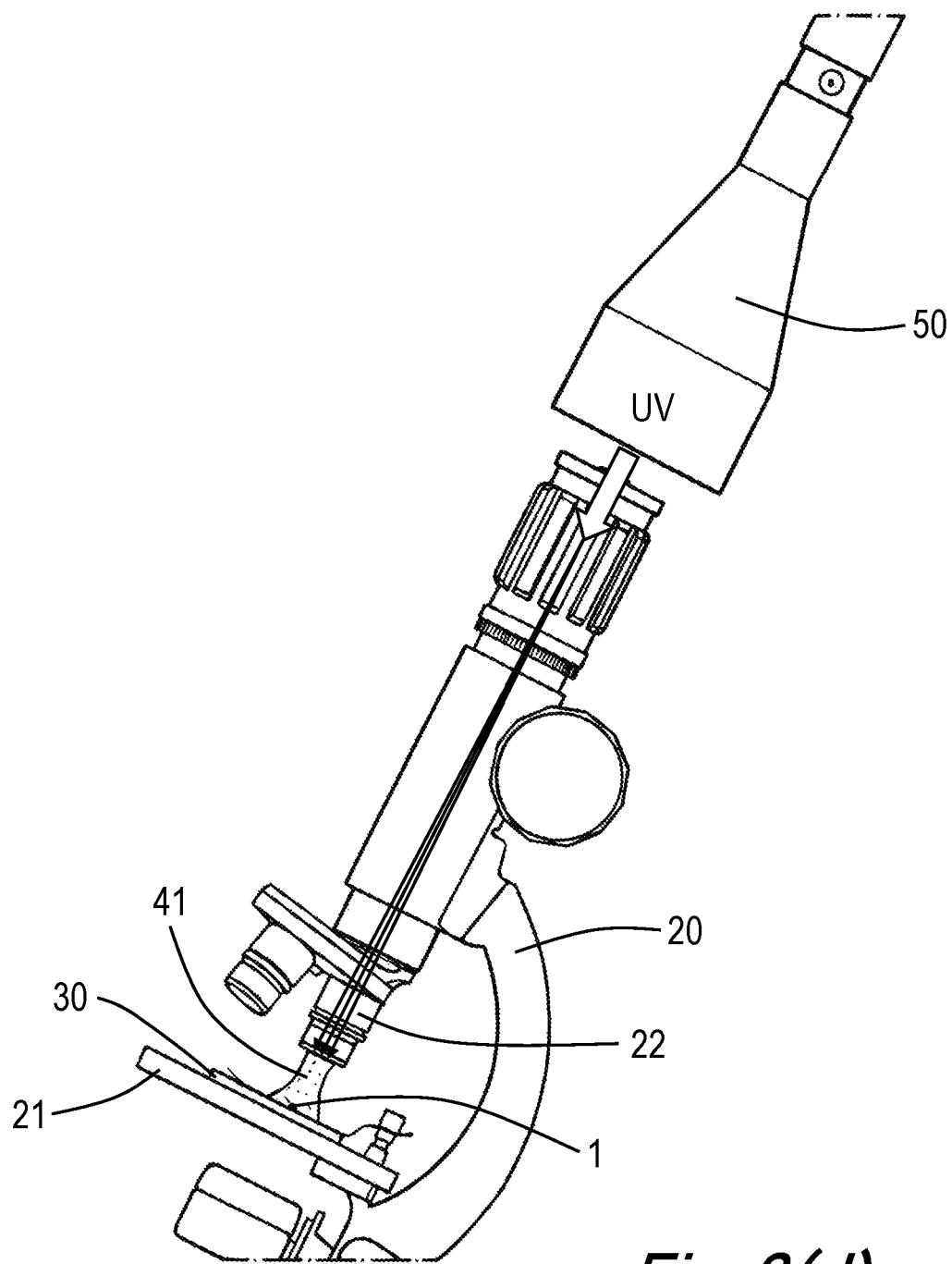
Figure 3E:
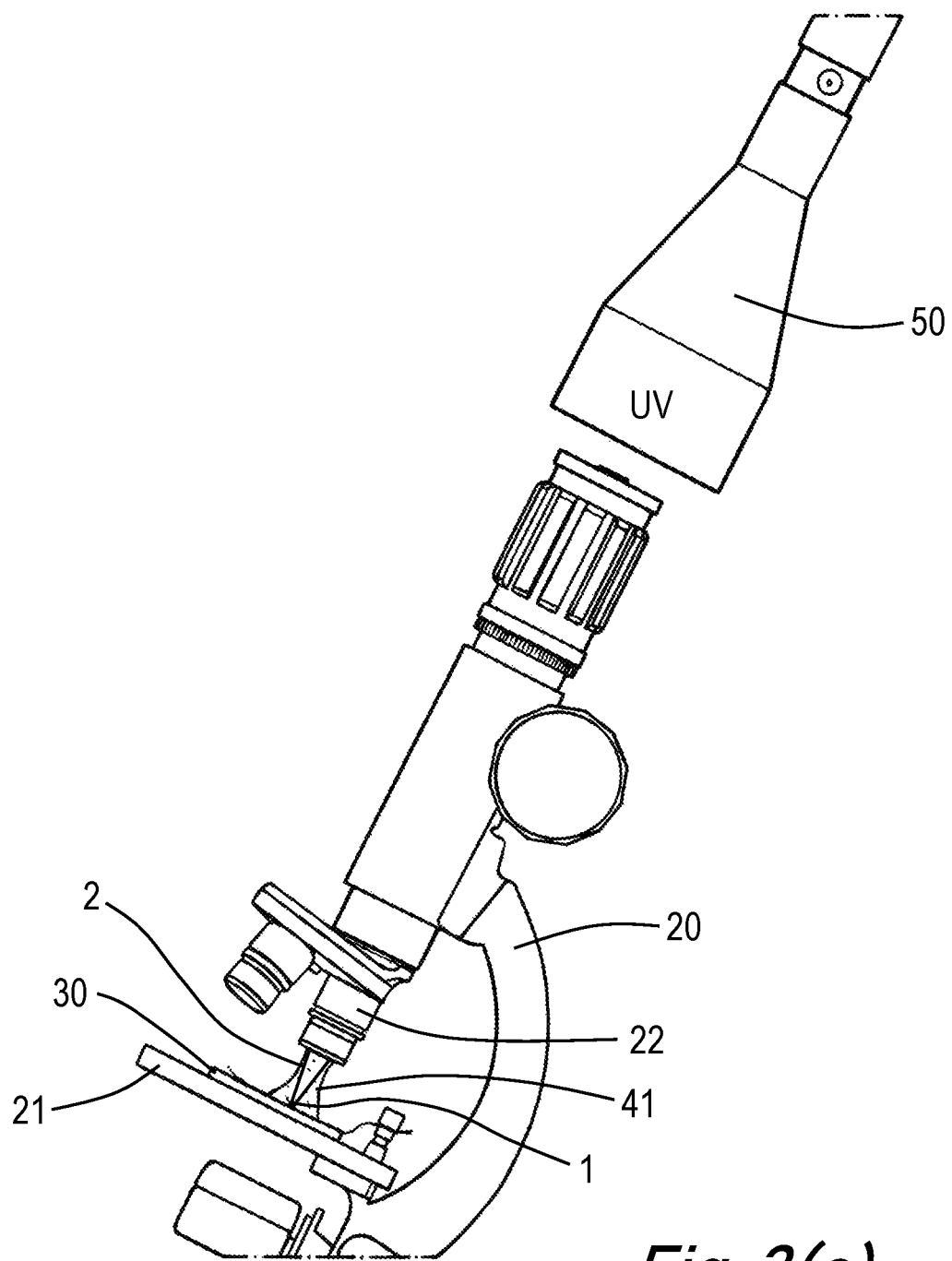
Figure 3F:
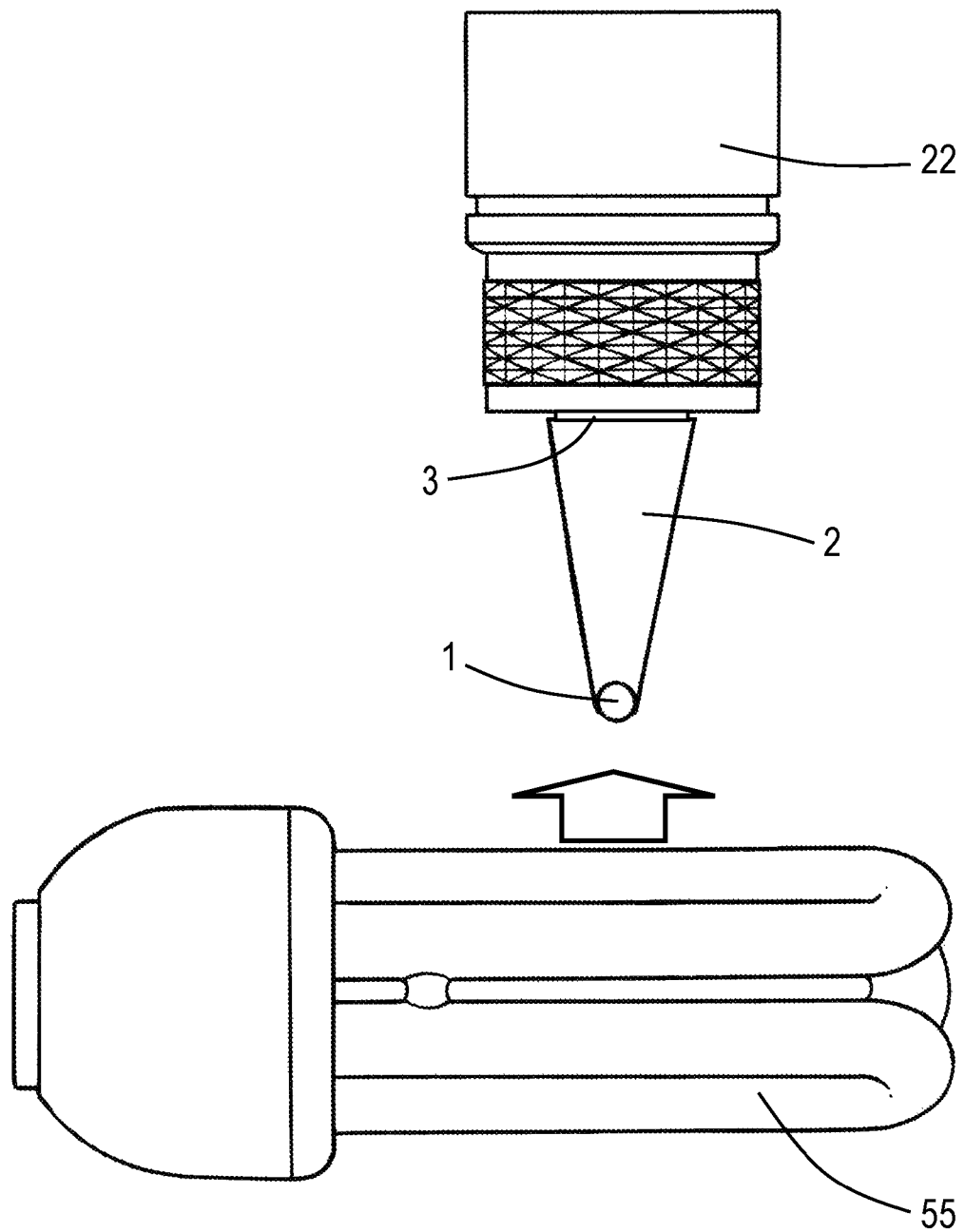

Turning to FIG. 1, a microsphere lens assembly 10 for use with a microscope is shown. The microsphere lens assembly 10 comprises a microsphere lens 1 and a base lens 3 connected together by a column of optically clear material 2. In the example shown in FIG. 1, the microsphere lens 1 is in the form of a single microsphere 11.

The column of optically clear material 2, holds the microsphere lens 1 in a fixed position relative to the base lens 3. If the microsphere lens 1 is fixed in the correct position relative to the base lens 3, the assembly 10 can be used, in combination with a suitable microscope, for carrying out super resolution microscopy and/or machining.

For practical implementations, the base lens 3 either comprises the objective lens of a microscope or the front lens of an objective lens arrangement. In a preferred embodiment, as is shown in FIG. 2, the base lens 3 is a removable front lens of an objective lens arrangement 6. Such a lens arrangement 6 may typically comprise a series of selected lenses fitted at fixed separation with relation to one another within a housing 7. The front lens mount 5 may be relaseably attachable to the housing 7, the releaseable attachment being by way of a screw thread or the like. This enables the front lens to be removed for cleaning and/or for the front lens to be replaced in the event that it is damaged. This is cheaper and simpler than repairing or replacing an entire objective lens arrangement 6.

In this example, the front lens mount 5 is adapted to engage with the edges 4 of the base lens 3 to releasably retain the base lens 3 and hence the lens assembly 10 within the mount. Accordingly, if the lens assembly 10 is damaged, it may be removed for repair or replacement.

Turning now to FIGS. 3(*a*) to 3(*f*), a method for manufacturing the lens assembly of FIG. 1 is illustrated schematically. A microsphere lens 10, in this example comprising a single microsphere 11 is placed on a known sample 30. The sample is placed on the scanning stage 21 of a microscope 20. The objective lens 22 to which the microsphere lens assembly 10 is to be fitted is selected. The objective lens 22 comprises an objective lens arrangement 6 as illustrated in FIG. 2 within a housing 7 and has a removable front lens 3 which will form the base lens 3 of the microsphere assembly. The objective lens 22 and scanning stage may be adjusted at this stage to centre the microsphere lens 10 in the field of view of the objective lens 22 and to focus the objective lens 22 such that the portion of the sample 30 viewed through both objective lens 22 and microsphere lens 10 is in focus.

As is illustrated in FIG. 3(*b*), an optically clear UV curable adhesive (or resin) 40 is applied between the front lens 3 and the microsphere lens 1. This results in the formation of a body 41 of adhesive between the front lens 3 and the microsphere lens 1 as is shown in FIG. 3(*c*). The adhesive 40 selected must have suitable properties for eth type of imaging (or machining) for which the completed assembly is to be used. For instance, if the assembly 10 is to be used to conduct fluorescence imaging the adhesive 40 must have very good UV transparency. Similarly, if the assembly 10 is to be used to conduct imaging or machining using a relatively high refractive index (say, 1.5 or more) microsphere lens 1, the adhesive 40 must have very good IR transparency.

At this stage final adjustment of the objective lens 22 and the scanning stage 21 is carried out to centre the microsphere lens 10 in the field of view of the objective lens 22 and to focus the objective lens 22 such that the portion of the sample 30 viewed through both objective lens 22 and microsphere lens 10 is in focus. After the final adjustment above is complete a UV light source is 50 is used to illuminate the back of the base lens 3. In the illustrative example shown in FIG. 3 (*d*), the UV light source is positioned at the eyepiece 23 of the microscope 20. In more typical embodiments, the UV light source may be coupled to a camera port (not shown) or other port for illumination of a sample.

The UV light from light source 50 is focussed on microsphere lens 1 by the base lens 3, in combination with the objective lens arrangement 6. The UV light cures a column 2 within the body 41 as is shown in FIG. 3(*e*). The duration and intensity of UV light exposure will depend upon the properties of the UV adhesive selected to form the body 41. The geometry of the column 2 is defined by the optical properties of the base lens 3. Typically, the column 2 has a substantially cone like form tapering between the edges of the base lens 3 and the edges of the microsphere lens 1.

After formation of column 2, the uncured material forming the remainder of the body 41 can be removed to leave the microsphere assembly 10. Typically, removal of the excess optically clear material might be achieved by washing with a solvent. The column 2 may then be illuminated by a second UV light source 55 for an extended period of time to undergo further curing as is illustrated in FIG. 3 (*f*). Subsequently, the column 2 and/or microsphere lens 1 may optionally undergo further cleaning and polishing as desired or required.

The above method thus provides a simple an effective construction of a microsphere lens assembly 10 for super resolution microscopy or machining. Given that the process is relatively simple, it is possible to use the process to form multiple microsphere lens assemblies 10 using spare base lens 3. This can enable simple replacement of an assembly 10 damaged during use. It is additionally or alternatively possible to form multiple microsphere lens assemblies 10 from different combinations of base lenses 3 and microsphere lenses 1. This can enable the formation of different microsphere lens assemblies 10 with properties optimised for imaging or machining different samples.

Figure 4:
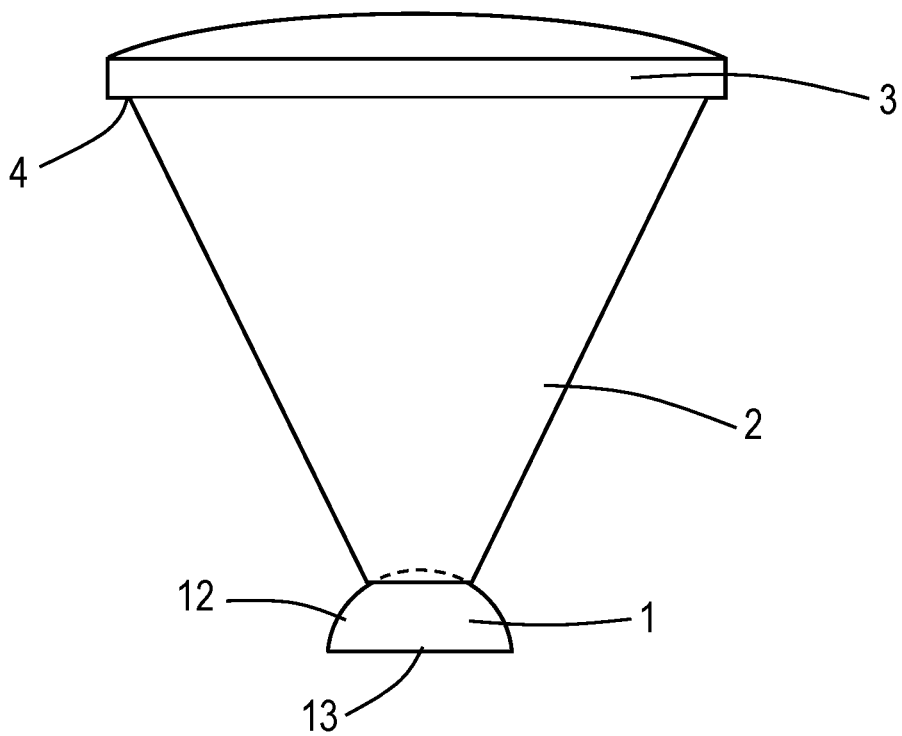
FIG. 4 shows an alternative embodiment of a microsphere lens assembly for a microscope comprising a single truncated microsphere according to the present invention.

For example, as is shown in FIG. 4, the microsphere lens 1 of the microsphere lens assembly 10 comprises a truncated microsphere 12. Such an assembly 10 can be formed using a microsphere 11 by the same steps as are described in relation to FIGS. 3(*a*) to 3(*f*) with the additional step of removing a spherical cap from the front of the microsphere 11 to leave a truncated front face 13.

The removal may take place by any suitable process. In one example removal may be achieved by use of a focussed ion beam to cut the microsphere 11. In an alternative example, the removal may be achieved by use of a milling stage to grind the microsphere 11. The milling stage may be successively utilised with different diamond pastes to enable rapidly removal of material in the initial stages of the process and to enable polishing of the front face 13 in the final stages of the process.

Figure 5:
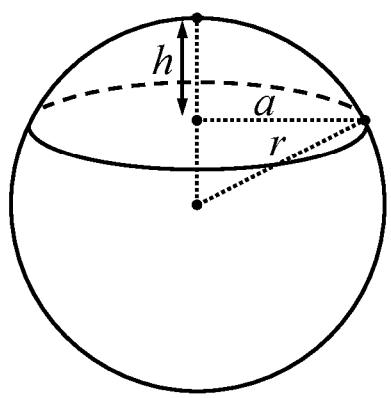
FIG. 5 illustrates a truncated microsphere for use in the microsphere assembly of FIG. 4.

The assembly 10 of FIG. 4 can be effectively utilised with a shorter separation between sample and the microsphere lens 1 than the assembly 10 of FIG. 1. The reduction in separation distance is related to the amount of material cut away to form the truncated microsphere 12. FIG. 5 illustrates how eth truncated microsphere 12 is defined by two variables (a and h); the distance h and can reach a maximum length which equals to the radius of the microsphere which is r. In the trivial case where a=r, the truncated microsphere 12 is a micro hemisphere.

The greater the value of h, the lower the numerical aperture for a given microsphere diameter, refractive index and wavelength. The effective field of view (A) without aberrations for a truncated microsphere 12 is given by the formula: $A = \pi^2$.

Figure 6:
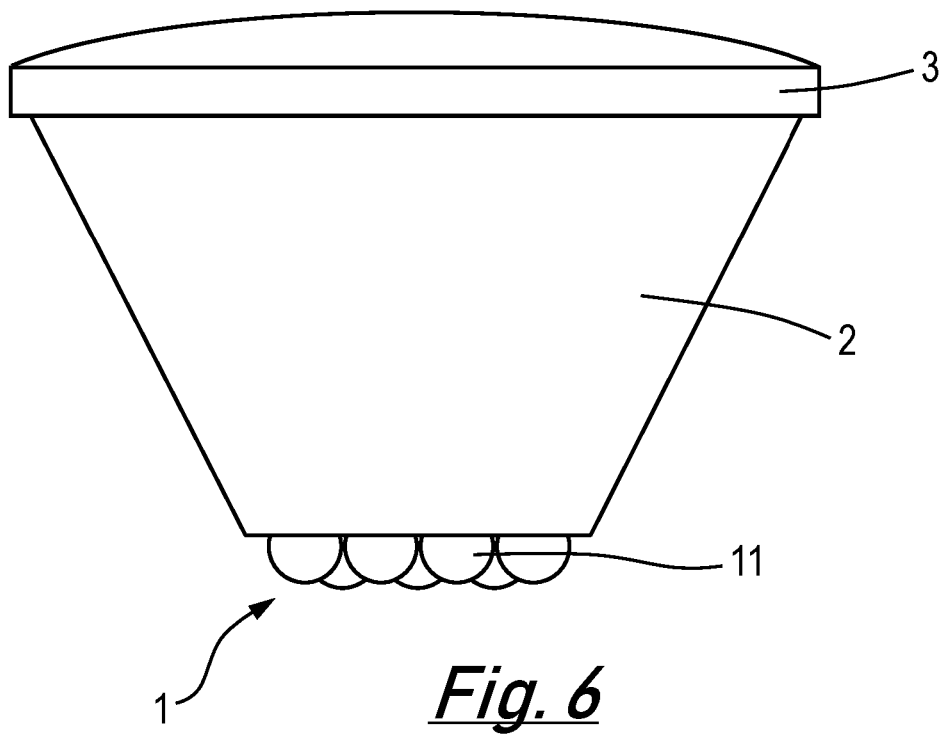
FIG. 6 shows an embodiment of a microsphere lens assembly for a microscope comprising an array of microspheres according to the present invention.

In addition to assemblies 10 comprising a single microsphere 11 or a truncated microsphere 12, it is also possible to provide an assembly 10 where the microsphere lens 1 comprises an array of microspheres 11 as is shown in FIG. 6. Such an assembly can be formed using the same method as described in relation to FIGS. 3(*a*) to 3(*f*) above with the exception that the initial step is the provision of the microsphere array 14 on the sample 30. The microsphere 11 array can be formed by any suitable method. In the present instance, for relatively small arrays, the array may be formed by self-assembly after the depositing of a drop of fluid, typically water, having a suitable concentration of microspheres 11 suspended therein. As the water evaporates, the microspheres 11 self-assemble into a close packed array.

Figure 7:
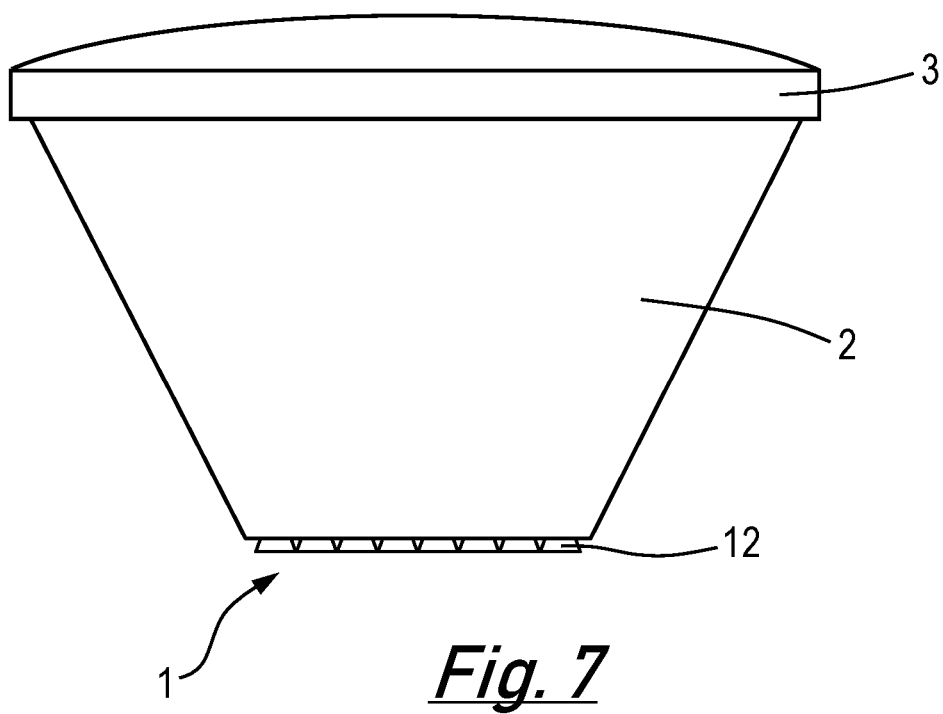
FIG. 7 shows an embodiment of a microsphere lens assembly for a microscope comprising an array of truncated microspheres according to the present invention.

In a further embodiment of an assembly shown in FIG. 7, the microsphere lens 1 comprises an array of truncated microspheres 12. Such an assembly 10 can be formed using the same method as described in relation to FIGS. 3(a) to 3(f) above and the initial step of providing a microsphere 11 array on the sample 30 as described in relation to FIG. 6 above. The method of manufacturing the assembly 10 in FIG. 7 then includes the additional step of removing a spherical cap from the front of each microsphere 11 to leave a truncated front face 13. The removal may be achieved by the use of a focussed ion beam or a milling stage as described above in relation to FIG. 4.

The microsphere lens assemblies 10 discussed above may be utilised for imaging of a sample 30 and/or machining of a sample 30 as required or as desired.

Whilst the above embodiments have been described primarily in terms of forming a microsphere lens assembly 10 on a base lens 3 comprising a front lens of an objective lens arrangement, the skilled man will appreciate that it is also possible to form such an assembly 10 on a base lens comprising a single piece objective lens.

The above embodiments are described by way of example only. Many variations are possible without departing from the scope of the invention as defined in the appended claims.

The invention claimed is:

1. A microscope apparatus comprising a microscope and a microsphere lens assembly, the microsphere lens assembly comprising: a base lens; a microsphere lens and a column of optically clear material extending from a front surface of the base lens to the microsphere lens, wherein the microsphere lens is fixed to the base lens by the column, wherein the column has a substantially conical shape extending from the front surface of the base lens to edges of the microsphere lens, and wherein the microsphere lens is comprised of a different material than the column.

2. A microsphere lens assembly as claimed in claim 1 wherein the microsphere lens comprises a microsphere or a truncated microsphere.

3. A microsphere lens assembly as claimed in claim 1 wherein the microsphere lens comprises an array of microspheres or an array of truncated microspheres.

4. A microsphere lens assembly as claimed in claim 1 wherein the optically clear material comprises glass or plastic.

5. A microsphere lens assembly as claimed in claim 1 wherein the optically clear material comprises an adhesive or resin and wherein the optically clear material is UV curable.

6. A microsphere lens assembly as claimed in claim 1 wherein the column extends from the surface of the base lens to the edges of the microsphere lens.

7. A microscope apparatus as claimed in claim 1, comprising anobjective lens or objective lens arrangement comprising the microsphere lens assembly.

8. A microscope apparatus as claimed in claim 7 wherein the apparatus comprises illumination means operable to illuminate the sample in reflection or transmission modes and a restricted aperture between the illumination means and the microsphere lens assembly.

9. A microscope apparatus as claimed in claim 7, wherein the apparatus comprises multiple objective lenses.

10. A microscope apparatus as claimed in claim 7, wherein the apparatus is provided with a machining laser beam source aligned to pass through the microsphere lens assembly.

11. A method of super resolution microscopy utilising a microscope apparatus according to claim 7, the method comprising: providing a sample; positioning the microsphere lens assembly relative to the sample and capturing one or more images of the sample.

12. A method as claimed in claim 11 wherein the method includes varying the separation between the microsphere lens assembly and the sample and varying the position of the sample relative to the microsphere lens assembly in a plane perpendicular to the optical axis of the microsphere lens assembly.

13. A method of machining utilizing a microscope apparatus according to claim 7, the method comprising:
   providing a sample; positioning the microsphere lens assembly relative to the sample;
   providing a machining laser beam source, aligned such that a machining laser beam passes through a microsphere lens assembly; and machining a target surface of the sample by exposing it to the machining laser beam source.

* * * * *